United States Patent
Böckler et al.

(10) Patent No.: US 11,525,472 B2
(45) Date of Patent: Dec. 13, 2022

(54) COOKING OVEN

(71) Applicant: ELECTROLUX APPLIANCES AKTIEBOLAG, Stockholm (SE)

(72) Inventors: Marco Böckler, Rothenberg ob der Tauber (DE); Daniel Krämer, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 1220 days.

(21) Appl. No.: 16/061,508

(22) PCT Filed: Nov. 25, 2016

(86) PCT No.: PCT/EP2016/078892
§ 371 (c)(1),
(2) Date: Jun. 12, 2018

(87) PCT Pub. No.: WO2017/102290
PCT Pub. Date: Jun. 22, 2017

(65) Prior Publication Data
US 2020/0263722 A1 Aug. 20, 2020

(30) Foreign Application Priority Data
Dec. 15, 2015 (EP) .................................. 15199991

(51) Int. Cl.
F16B 25/00 (2006.01)
F16B 5/02 (2006.01)
(Continued)

(52) U.S. Cl.
CPC .......... *F16B 25/0021* (2013.01); *F16B 5/02* (2013.01); *F16B 25/103* (2013.01); *F24C 7/08* (2013.01);
(Continued)

(58) Field of Classification Search
CPC .......... F16B 5/02; F16B 5/0275; F16B 25/00; F16B 25/0021; F16B 25/0031;
(Continued)

(56) References Cited

U.S. PATENT DOCUMENTS 3,176,118 A * 3/1965 Scott .................. G05D 23/1913
219/394
3,504,161 A * 3/1970 Kastovich ........... F24C 15/2014
219/393
(Continued)

FOREIGN PATENT DOCUMENTS

CN 2781582 Y 5/2006
CN 201293028 Y 8/2009
(Continued)

OTHER PUBLICATIONS

International Search Report & Written Opinion issued in corresponding application No. PCT/EP2016/078892 dated Feb. 2, 2017, 8 pages.
(Continued)

Primary Examiner — Roberta S Delisle
(74) Attorney, Agent, or Firm — Pearne & Gordon LLP

(57) ABSTRACT

The invention relates to a cooking oven comprising at least two entities made of sheet metal (2, 3), each sheet metal entity (2, 3) comprising at least one surface carrying an enamel layer, specifically a vitreous enamel layer, said enamelled sheet metal entities (2, 3) overlapping each other and a screw connection for grounding and coupling said enamelled sheet metal entities (2, 3), wherein a ground element is at least indirectly coupled with one of said enamelled sheet metal entities (2, 3) for grounding said stack of enamelled sheet metal entities (2, 3), wherein at least one screw (5) with a screw shaft (5.1) is provided through said enamelled sheet metal entities (2, 3), wherein the screw (5) is at least indirectly electrically coupled with the ground
(Continued)

element and said screw shaft (5.1) comprises a thread for providing an electric coupling between the enamelled sheet metal entities (2, 3).

13 Claims, 3 Drawing Sheets

(51) Int. Cl.
  *F16B 25/10* (2006.01)
  *F24C 7/08* (2006.01)
  *F24C 15/08* (2006.01)
  *H01R 4/66* (2006.01)
  *F16B 1/00* (2006.01)

(52) U.S. Cl.
  CPC .............. *F24C 15/08* (2013.01); *H01R 4/66* (2013.01); *F16B 25/00* (2013.01); *F16B 2001/0064* (2013.01)

(58) Field of Classification Search
  CPC .. F16B 25/0084; F16B 25/103; F16B 33/008; F16B 2001/0064; F24C 7/08; F24C 15/08; H01R 4/66
  USPC ................ 126/273 R, 275 E; 411/378, 387.4
  See application file for complete search history.

(56) References Cited

U.S. PATENT DOCUMENTS

| | | | | |
|---|---|---|---|---|
| 4,161,939 A * | 7/1979 | Scherer | ................... | F24C 15/08 126/39 M |
| 4,749,322 A * | 6/1988 | Sygnator | ............. | F16B 25/0084 411/533 |
| 5,234,301 A * | 8/1993 | Grossberndt | ......... | F16B 25/106 411/386 |
| 6,494,656 B1 * | 12/2002 | Boyer | ................... | B21H 3/027 411/416 |
| 2009/0311074 A1 * | 12/2009 | Friederich | ........... | F16B 25/0057 411/387.4 |
| 2009/0311075 A1 * | 12/2009 | Achenbach | ......... | F16B 25/0021 411/387.4 |
| 2011/0116894 A1 * | 5/2011 | Huang | .................. | F16B 25/103 411/387.4 |
| 2011/0305541 A1 * | 12/2011 | Shinjo | ..................... | F16B 25/00 411/387.4 |
| 2012/0107070 A1 * | 5/2012 | Bongartz | .............. | F16B 25/106 411/378 |
| 2013/0047414 A1 * | 2/2013 | Werthwein | .......... | F16B 25/0078 29/525.12 |
| 2013/0195579 A1 * | 8/2013 | Freis | ......................... | F16B 5/02 411/387.1 |
| 2015/0176623 A1 * | 6/2015 | Vogel | .................. | F16B 25/0052 411/387.4 |
| 2015/0275944 A1 * | 10/2015 | Duenisch | ............. | B62D 27/065 411/386 |

FOREIGN PATENT DOCUMENTS

| | | |
|---|---|---|
| CN | 203399644 U | 1/2014 |
| CN | 108368867 A | 8/2018 |
| DE | 202005007418 U1 | 7/2005 |
| DE | 102007010091 A1 | 9/2008 |
| WO | 2015043924 A1 | 4/2015 |

OTHER PUBLICATIONS

Chinese Office action and English translation issued in corresponding Chinese Patent Application No. 201680071807.1 dated Jun. 3, 2019, 17 pages.

* cited by examiner

COOKING OVEN

Generally, the present invention relates to the field of cooking ovens. More specifically, the present invention relates to a cooking oven with a screw connection being adapted to provide a grounding of a pair of enamelled sheet metal entities.

BACKGROUND OF THE INVENTION

Household or kitchen appliances, e.g. baking ovens, dish washers, washing machines etc. are known in prior art. In order to comply with safety regulations, metallic entities of a household or kitchen appliance have to be grounded.

In household or kitchen appliances, metallic entities, specifically sheet metal entities may be enamelled, i.e. comprise a non-conductive enamel coating. In state of the art appliances each enamelled metallic entity is grounded separately which requires a plurality of ground couplings.

SUMMARY OF THE INVENTION

It is an objective of the embodiments of the invention to provide a cooking oven which comprises screw connections that reduce the effort for grounding enameled metallic entities. If not explicitly indicated otherwise, embodiments of the invention can be freely combined with each other.

According to an aspect, the invention relates to a cooking oven. Said cooking oven may be, for example, a steam cooking oven or a domestic oven. The cooking oven comprises a screw connection for grounding and coupling a stack of enamelled sheet metal entities. The screw connection comprises at least a first and a second enamelled sheet metal entity. Each enamelled sheet metal entity comprises at least one surface area at which an enamel layer, specifically a vitreous enamel layer is provided. A ground element is at least indirectly coupled with one of said enamelled sheet metal entities for grounding said stack of enamelled sheet metal entities. At least one screw with a screw shaft is provided through said enamelled sheet metal entities. The screw is at least indirectly electrically coupled with the ground element. In addition, the screw shaft comprises a thread for providing an electric coupling between the enamelled sheet metal entities.

Said cooking oven is advantageous because by using a single screw connection, at least a pair of enamelled sheet metal entities is electrically coupled with each other thereby providing a grounding of said enamelled sheet metal entities.

According to embodiments, the ground element is directly or indirectly electrically coupled with one of said enamelled sheet metal entities for grounding said enamelled sheet metal entity. For example, the ground element may be a wire electrically coupled with one of said enamelled sheet metal entities for grounding said enamelled sheet metal entity. "Indirect coupling" in the present context means that the ground element is coupled with one of said enamelled sheet metal entities via at least one electrically conductive item (wire, metal element etc.). The grounding between the first and the second sheet metal entities is provided by means of the screw connection.

According to embodiments, the ground element is a non-enamelled sheet metal entity being arranged on top of the stack of enamelled sheet metal entities. Said non-enamelled sheet metal entity may be coupled with a ground wire. The screw provides an electric coupling between the non-enamelled sheet metal entity and the enamelled sheet metal entities.

According to embodiments, at least one of the enamelled sheet metal entities comprises a hole for receiving the screw shaft. Said hole may be core hole comprising a diameter adapted to the screw shaft diameter such that the thread provided at the screw shaft penetrates the enamel layer thereby realizing an electrical coupling between the screw and the sheet metal entity.

According to embodiments, each enamelled sheet metal entity comprises a hole and the holes of the enamelled sheet metal entities are congruent. For example, the holes may comprise the same or essentially the same diameter and may be directly arranged above each other. Thereby a through hole through both sheet metal entities for receiving the screw shaft is obtained.

According to embodiments, the non-enamelled sheet metal entity comprises a hole, wherein said hole comprises a diameter greater than the diameter of the hole provided in one of said enamelled sheet metal entities. The hole may be a clearance hole, i.e. the diameter is chosen such that the screw thread does not cut into the non-enamelled sheet metal entity. However, the diameter of said hole may be chosen such that the screw head of the screw provided through said hole is greater than the hole. Thereby, the screw head rests against the non-enamelled sheet metal entity, when the screw is tighten, thereby obtaining an electrically conductive connection between the non-enamelled sheet metal entity and the screw.

According to embodiments, the hole in the non-enamelled sheet metal entity is arranged concentrically to the hole provided in one of said enamelled sheet metal entities.

According to embodiments, the screw is a metal screw, specifically a sheet metal screw or a self-tapping screw. Such screws comprise a thread which cuts through the enamel coating in order to ensure a reliable electrical connection.

According to embodiments, the enamelled sheet metal entities abut against each other in the area of the screw shaft. Thereby a solid mechanical and electrical coupling of the enamelled sheet metal entities is obtained.

According to embodiments, the non-enamelled sheet metal entity and the enamelled sheet metal entities abut against each other in the area of the screw shaft. Thereby a stack of sheet metal entities is obtained which is mechanically and electrically coupled by means of said screw.

According to embodiments, the screw is adapted to cut into the vitreous enamel provided at the enamelled sheet metal entities. Thereby, the enamel is removed by the screw cutting into the sheet metal and an electrical connection between the sheet metals and between said sheet metals and the ground element is obtained.

The terms "essentially", "substantially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
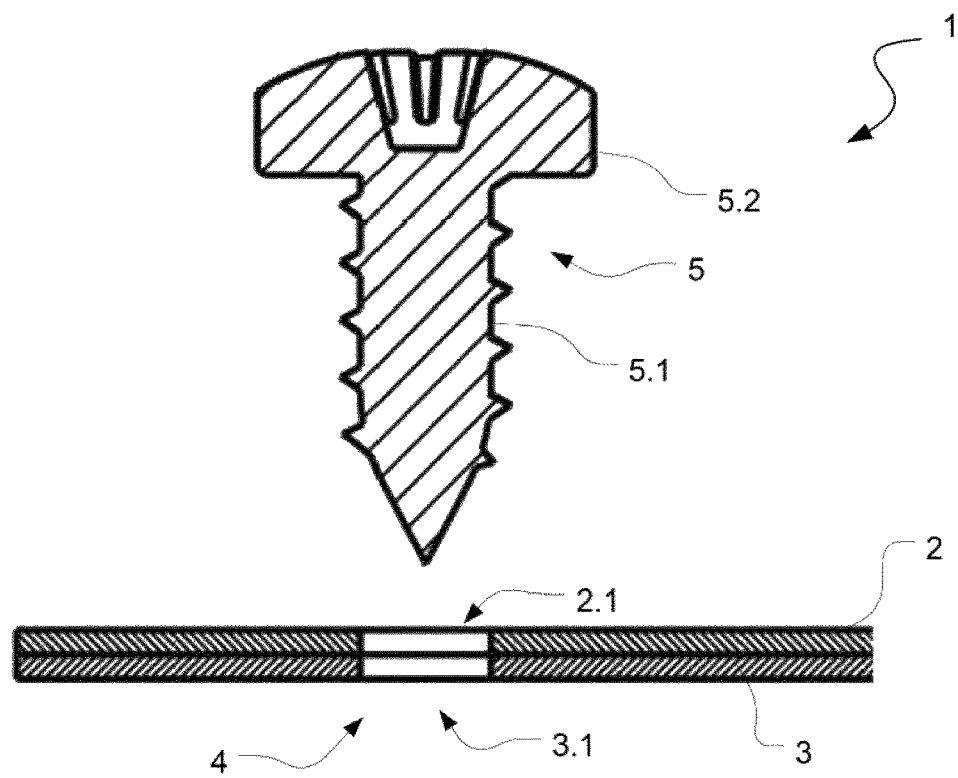
FIG. 1 shows a schematic sectional view of a screw connection according to a first exemplary embodiment.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 illustrates a first embodiment of a screw connection 1. The screw connection 1 comprises at least a first and a second enamelled sheet metal entity 2, 3, i.e. the sheet metal entities 2, 3 comprise an enamel layer covering at least one side of the sheet metal entity. The enamel layer may be electrically insulating, i.e. due to the enamel layer there is no electrical connection between the first and the second enamelled sheet metal entity 2, 3. For example, the first and the second enamelled sheet metal entity 2, 3 may form integral parts of an electric appliance, e.g. an electric household appliance (baking oven etc.). In a specific embodiment, the first enamelled sheet metal entity 2 may be a front frame of a baking oven and the second enamelled sheet metal entity 3 may be an element forming the oven cavity of the baking oven.

As shown in FIG. 1, the first and second sheet metal entities 2, 3 comprise at least portions at which the sheet metal entities 2, 3 are parallel to each other and/or abut against each other. In other words, the first and second sheet metal entities 2, 3 may form a stack of sheet metal entities 2, 3 in the area of the connecting section 4 at which the sheet metal entities 2, 3 are connected by means of at least one screw 5. It is worth mentioning that said screw 5 is made of an electrical conductive material, specifically metal.

In the present embodiment, one of the sheet metal entities 2, 3 may be grounded, i.e. electrically coupled with ground. Said grounding is realized by electrically coupling the sheet metal material 2, 3 with a ground element (includes direct or indirect coupling) (not shown). Said ground element may be, for example, a connecting portion adapted to receive a ground wire. Thereby, one of said sheet metal entities 2, 3 is connected to ground potential.

In order to be able to electrically connect the enamelled sheet metal entities 2, 3, the insulating enamel layer has to be at least partially removed and an electrical connection between the portions at which said enamel has been removed has to be provided.

The example embodiment of FIG. 1 provides a hole 2.1, 3.1 in each of said sheet metal entities 2, 3. Said holes 2.1, 3.1 may comprise the same or essentially the same diameter. For example, the holes 2.1, 3.1 may be core holes with a diameter adapted to the diameter of the screw 5 to be received such, that the thread removes the enamel thereby obtaining an electrical contact between the screw 5 and the sheet metal beneath the enamel layer. The screw 5 may remove the enamel at both holes 2.1, 3.1 thereby realizing an electrically conductive coupling between the first and the second enamelled sheet metal entity 2, 3. In other words, the non-grounded enamelled sheet metal entity is grounded via the screw 5 coupling the first and the second enamelled sheet metal entities 2, 3.

The screw 5 may be, for example, a sheet metal screw comprising a tapping screw thread similar to a wood screw. Thereby, the thread of the screw cuts through the enamel layer into the sheet metal which ensures a high reliable electrical connection.

Figure 2:
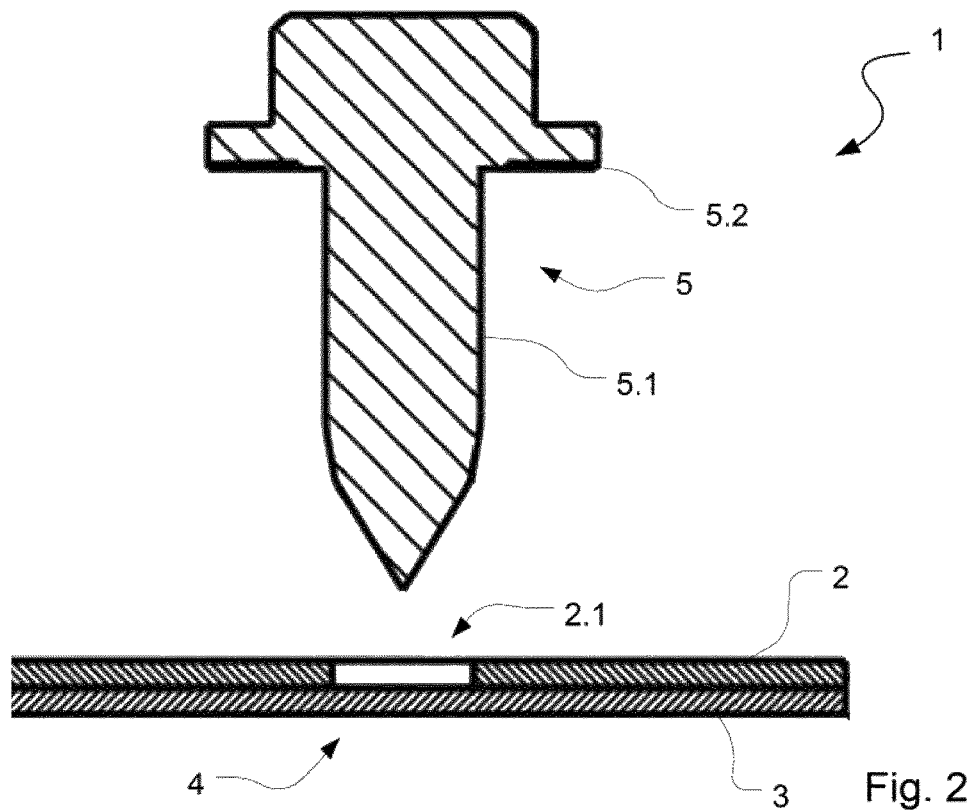
FIG. 2 shows a schematic sectional view of a screw connection according to a second exemplary embodiment.

FIG. 2 illustrates a second embodiment of a screw connection 1. The second embodiment is similar to the upper-described first embodiment. Therefore, in the following only the differences to the first embodiment are explained. Apart from that, reference is made to the description of the embodiment of FIG. 1.

The main difference is that only the first enamelled sheet metal entity 2 comprises a hole 2.1 and no hole is provided in the second enamelled sheet metal entity 3 below said hole 2.1. In order to be able to insert a screw 5 through the hole 2.1 of the first enamelled sheet metal entity 2 and the second enamelled sheet metal entity 3, the screw 5 is a self-tapping screw which comprises a free end of the screw shaft 5.1 adapted to cut through the second enamelled sheet metal entity 3.

As already mentioned before, the diameter of the self-tapping screw 5 may be chosen such that the enamel in the area of the hole 2.1 is removed when screwing the screw 5 into the hole 2.1 thereby realizing an electrical coupling between the first and the second enamelled sheet metal entity 3 by means of said screw 5. The embodiment of FIG. 2 is advantageous because the accuracy of fit can be lowered because there is no need of concentrically arranged holes.

Figure 3:
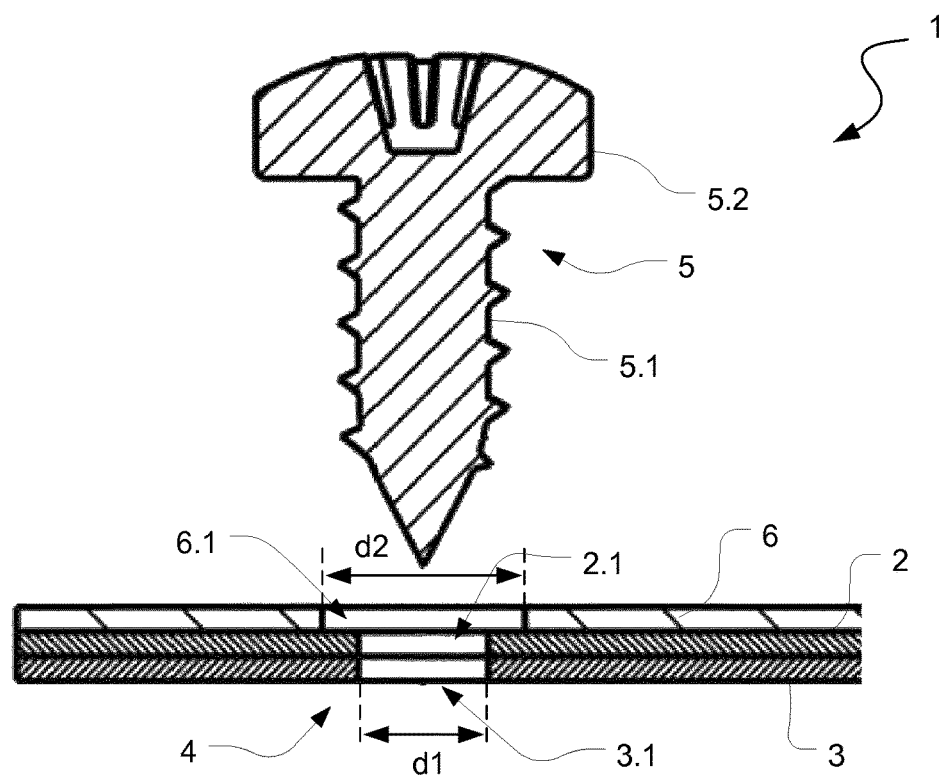
FIG. 3 shows a schematic sectional view of a screw connection according to a third exemplary embodiment.

FIG. 3 shows a third embodiment of a screw connection 1. The third embodiment is similar to the upper-described first embodiment according to FIG. 1. Therefore, in the following only the differences to the first embodiment are explained. Apart from that, reference is made to the description of said first embodiment.

The main difference is that a third sheet metal entity 6 is provided on top of said first and second enamelled sheet metal entities 2, 3. Said third sheet metal entity 6 may be made of metal. For example, the third sheet metal entity 6 may be a bracket. Furthermore, the third sheet metal entity 6 provided on top of the first and second enamelled sheet metal entities 2, 3 may comprise no enamel layer. Said non-enamelled third sheet metal entity 6 may be grounded, e.g. by a suitable ground connector electrically coupled with said third sheet metal entity 6. At least in the area around the connecting section 4, said third sheet metal entity 6 abuts against the first sheet metal entity 2 (which itself lies against the second sheet metal entity 3). In other words, in the area around the connecting section 4, a stack of at least three sheet metal entities is provided.

The third sheet metal entity 6 also comprises a hole 6.1 for receiving a screw 5. Said hole 6.1 may be concentric or essentially concentric to the holes 2.1, 3.1 provided in the first and second enamelled sheet metal entities 2, 3. Preferably, the hole 6.1 may comprise a diameter d2 greater than the diameter d1 of the holes 2.1, 3.1.

The third sheet metal entity 6 may provide a contact surface for the screw head 5.2 thereby obtaining an electrical connection between the screw 5 and the grounded third sheet metal entity 6. The grounding of the enamelled first and second sheet metal entity 2, 3 may be obtained by the screw thread cutting or tapping into the metallic sheet metal.

Figure 4:
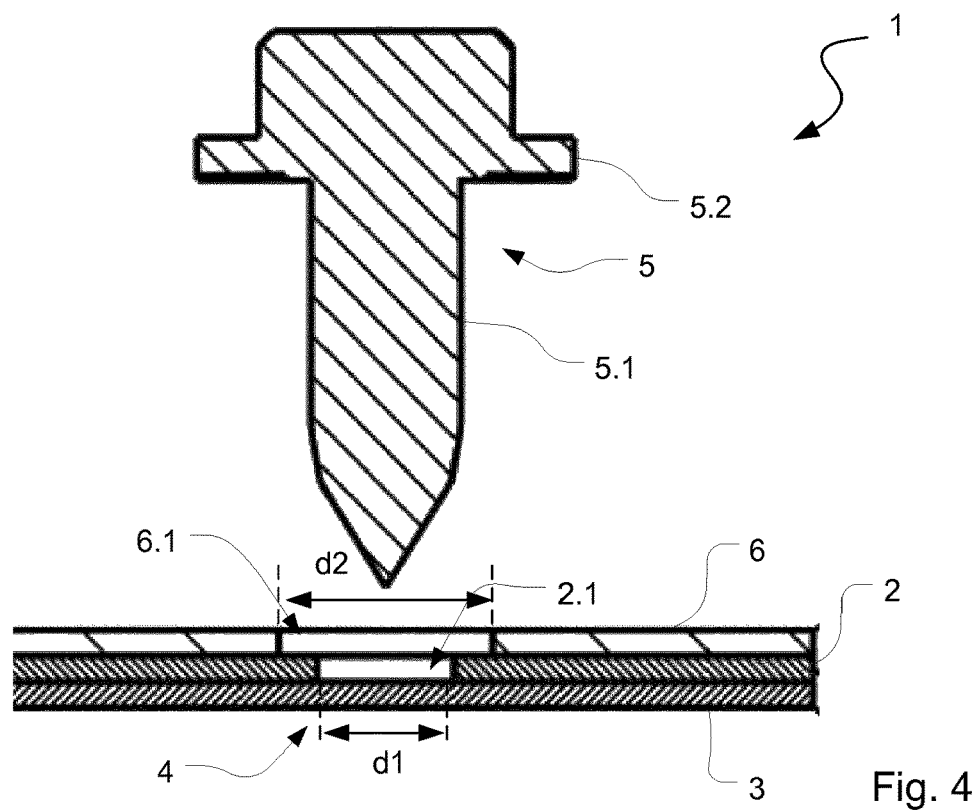
FIG. 4 shows a schematic sectional view of a screw connection according to a fourth exemplary embodiment.

FIG. 4 shows a fourth embodiment of a screw connection 1. The fourth embodiment is similar to the upper-described third embodiment. Therefore, in the following only the differences to the third embodiment are explained. Apart from that, reference is made to the description of the embodiment of FIG. 1.

The main difference is that only the first enamelled sheet metal entity 2 comprises a hole 2.1 and no hole is provided in the second enamelled sheet metal entity 3 below said hole 2.1. In order to be able to insert a screw 5 through the hole 2.1 of the first enamelled sheet metal entity 2 and the second enamelled sheet metal entity 3, the screw 5 is a self-tapping screw which comprises a free end of the screw shaft 5.1 adapted to cut through the second enamelled sheet metal entity 3.

As already mentioned before, the diameter of the self-tapping screw 5 may be chosen such that the enamel in the area of the hole 2.1 is removed by screwing the screw 5 into the hole 2.1 thereby realizing an electrical coupling between the first and the second enamelled sheet metal entity 2, 3 by means of said screw 5. The embodiment of FIG. 2 is advantageous because the accuracy of fit can be lowered because there is no need of concentrically arranged holes.

The grounding of the first and second enamelled sheet metal entity 2, 3 may be realized via the non-enamelled third sheet metal entity 6 providing a contact surface for the screw head 5.2 thereby obtaining an electrical connection between the screw 5 and the grounded third sheet metal entity 6. Said screw 5 may realize the electrical connection to the first and second sheet metal entity 2, 3 by means of the screw thread cutting or tapping into the metallic sheet metal.

Figure 5:
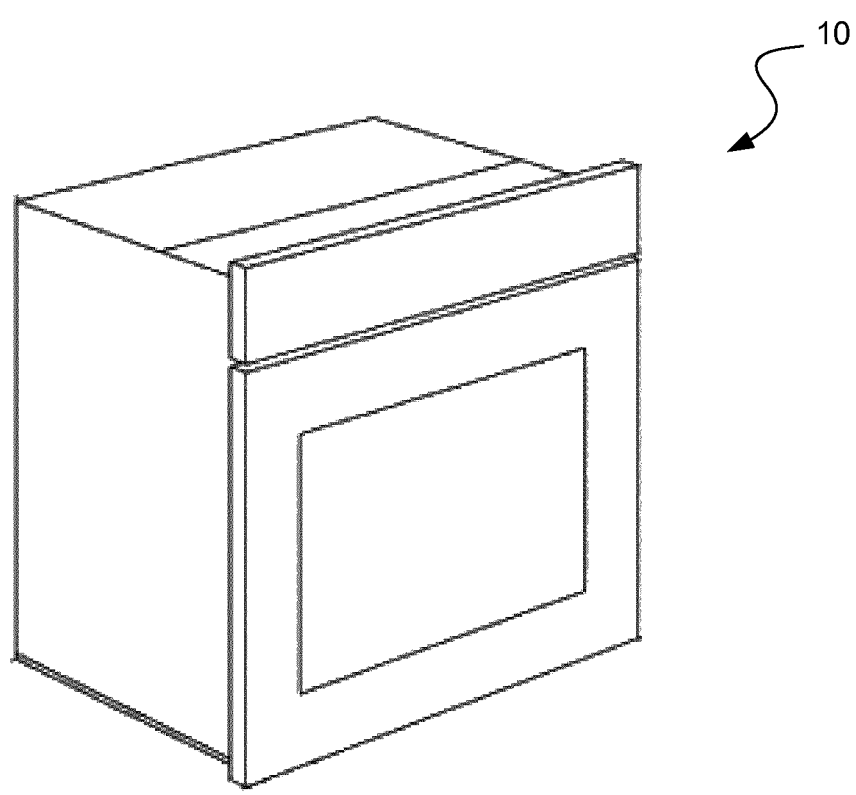
FIG. 5 shows an example schematic view of a baking oven.

FIG. 5 shows a schematic diagram of a household or kitchen appliance 10, according to the present embodiment constituted by a baking oven. The baking oven may comprise screw connections as described above for coupling enamelled sheet metal entities. According to other embodiments, the household or kitchen appliance 10 may be a dish washer, a washing machine, a dryer or the like.

Above, embodiments of a cooking oven according to the present invention as defined in the appended claims have been described. These should be seen as merely non-limiting examples. As understood by a skilled person, many modifications and alternative embodiments are possible within the scope of the invention.

LIST OF REFERENCE NUMERALS 1 screw connection
2 first sheet metal entity
2.1 hole
3 second sheet metal entity
3.1 hole
4 connecting section
5 screw
5.1 screw shaft
5.2 screw head
6 third sheet metal entity
6.1 hole
10 cooking oven
d1 diameter
d2 diameter

The invention claimed is:

1. Cooking oven comprising at least two entities made of sheet metal, each said sheet metal entity comprising at least one surface carrying an enamel layer, said enamelled sheet metal entities overlapping each other and a screw connection for grounding and coupling said sheet metal entities, wherein a ground element is at least indirectly coupled with one of said enamelled sheet metal entities for grounding said stack of enamelled sheet metal entities, wherein the ground element is a non-enamelled sheet metal entity arranged on top of the stack of enamelled sheet metal entities, wherein at least one screw with a screw shaft is provided through said enamelled sheet metal entities, wherein the screw is at least indirectly electrically coupled with the ground element and said screw shaft comprises a thread for providing an electric coupling between the enamelled sheet metal entities.

2. Cooking oven according to claim 1, wherein the ground element is directly electrically coupled with one of said enamelled sheet metal entities for grounding said enamelled sheet metal entity.

3. Cooking oven according to claim 1, wherein the non-enamelled sheet metal entity comprises a hole having a diameter greater than the diameter of the respective hole provided in one of said enamelled sheet metal entities.

4. Cooking oven according to claim 3, wherein the hole in the non-enamelled sheet metal entity is arranged concentrically to said respective hole provided in one of said enamelled sheet metal entities.

5. Cooking oven according to claim 1, wherein the non-enamelled sheet metal entity and the enamelled sheet metal entities abut against each other in the area of the screw shaft.

6. Cooking oven according to claim 1, wherein at least one of the enamelled sheet metal entities comprises a hole for receiving the screw shaft.

7. Cooking oven according to claim 1, wherein each enamelled sheet metal entity comprises a hole, and the respective holes of the enamelled sheet metal entities are congruent.

8. Cooking oven according to claim 1, wherein the screw is a metal screw.

9. Cooking oven according to claim 1, wherein the enamelled sheet metal entities abut against each other in the area of the screw shaft.

10. Cooking oven according to claim 1, wherein the screw is adapted to cut into the enamel layer provided at the enamelled sheet metal entities.

11. The cooking oven according to claim 1, wherein the at least one screw penetrates the non-enamelled sheet metal entity to establish the screw connection between the enamelled sheet metal entities, such that a head of the grounding screw abuts the non-enamelled sheet metal entity.

12. A cooking appliance comprising a sheet metal stack having first, second and third sheet metal layers, said first and second sheet metal layers abutting and overlapping one another and carrying respective first and second non-conductive enamel coating layers, a screw penetrating respective first and second holes in said first and second sheet metal layers, said screw having a thread that that cuts through said first and second enamel coating layers on screwing into said first and second holes in order to ensure a reliable electrical connection between each of said first and second sheet metal layers and said screw, said third sheet metal layer having no non-conductive enamel coating, said third sheet metal layer abutting and overlapping said second sheet metal layer and having a third hole therein arranged concentrically with and has a larger diameter than each of said first and second holes, a shaft of said screw having said threads thereon penetrating said first and second holes through said third hole, a head of said screw abutting against a surface of said third sheet metal layer opposite said second sheet metal layer and thereby being electrically coupled thereto, said first and second sheet metal layers being thereby commonly grounded to said third sheet metal layer via said screw.

13. The cooking appliance according to claim 12, said first and second holes being congruent, said third hole having a diameter larger than said first and second holes, said screw being metal.

\* \* \* \* \*